(12) United States Patent
Wolff et al.

(10) Patent No.: US 8,404,606 B2
(45) Date of Patent: Mar. 26, 2013

(54) OPTICAL GLASS, OPTICAL ELEMENTS MADE THEREFROM, METHOD OF MAKING THE OPTICAL ELEMENTS FROM THE GLASS, AND OPTICAL COMPONENTS COMPRISING ONE OR MORE OPTICAL ELEMENTS

(75) Inventors: Silke Wolff, Hueckeswagen (DE); Karl Mennemann, Taunusstein (DE); Uwe Kolberg, Mainz (DE); Ute Woelfel, Mainz-Laubenheim (DE); Thomas Lifka, Mainz-Bretzenheim (DE)

(73) Assignee: Schott AG, Mainz (DE)

( * ) Notice: Subject to any disclaimer, the term of this patent is extended or adjusted under 35 U.S.C. 154(b) by 301 days.

(21) Appl. No.: 12/711,390

(22) Filed: Feb. 24, 2010

(65) Prior Publication Data

US 2010/0222199 A1 Sep. 2, 2010

(30) Foreign Application Priority Data

Feb. 27, 2009 (DE) .......................... 10 2009 010 701

(51) Int. Cl.
*C03C 3/068* (2006.01)
*C03C 3/155* (2006.01)
*C03B 11/00* (2006.01)

(52) U.S. Cl. ................ 501/78; 501/79; 501/50; 501/51; 501/64; 65/102; 65/126

(58) Field of Classification Search ................... 501/50, 501/51, 78, 79, 64; 65/64, 102, 126–132
See application file for complete search history.

(56) References Cited

U.S. PATENT DOCUMENTS

| | | | |
|---|---|---|---|
| 4,584,279 A | 4/1986 | Grabowski et al. | |
| 4,732,876 A * | 3/1988 | Nagamine et al. | ............... 501/78 |
| 7,091,145 B2 | 8/2006 | Wolff et al. | |
| 8,207,075 B2 | 6/2012 | Uehara et al. | |
| 2004/0023787 A1 | 2/2004 | Wolff et al. | |
| 2004/0220041 A1 | 11/2004 | Isowaki et al. | |
| 2005/0197243 A1* | 9/2005 | Hayashi | ............... 501/50 |
| 2006/0189473 A1 | 8/2006 | Endo | |
| 2007/0049483 A1 | 3/2007 | Hayashi | |
| 2009/0062101 A1* | 3/2009 | Uehara | ............... 501/53 |
| 2009/0197754 A1* | 8/2009 | Uehara et al. | ............... 501/42 |
| 2011/0028300 A1* | 2/2011 | Zou et al. | ............... 501/78 |

FOREIGN PATENT DOCUMENTS

| | | |
|---|---|---|
| CN | 1935717 | 3/2007 |
| CN | 101215082 | 7/2008 |
| CN | 101289276 | 10/2008 |
| CN | 101497495 | 8/2009 |
| DE | 26 52 747 | 6/1977 |
| DE | 27 56 161 | 6/1979 |
| DE | 22 65 703 | 6/1985 |
| DE | 33 43 418 | 6/1985 |
| DE | 102 27 494 | 12/2003 |
| DE | 10 2006 039 287 | 3/2007 |
| DE | 10 2006 024 805 | 11/2007 |
| EP | 1 433 757 | 6/2004 |
| JP | 60033229 | 2/1985 |
| JP | 2003238198 | 8/2003 |
| JP | 2004-175632 | 6/2004 |
| JP | 2005-047732 | 2/2005 |
| WO | WO 2006093062 A1 * | 9/2006 |
| WO | WO 2009096439 A1 * | 8/2009 |

OTHER PUBLICATIONS

ISO 10629—"Raw Optical Glass-Resistance to Attack by Aqueous Alkaline Solutions At 50 C—Test Method and Classification", International Standard. First Edition, Jul. 1, 1996.
ISO 8424—"Raw Optical Glass—Resistance to Attack by Aqueous Acidic Solutions At 25 C—Test Method and Classification", International Standard. Second Edition, Jun. 15, 1996.

\* cited by examiner

*Primary Examiner* — Karl Group
*Assistant Examiner* — Elizabeth A Bolden
(74) *Attorney, Agent, or Firm* — Michael J. Striker

(57) ABSTRACT

The lead-free and arsenic-free optical glasses have a refractive index of $1.83 \leq n_d \leq 1.95$ and an Abbé number of $24 \leq v_d \leq 35$, good chemical resistance, excellent crystallization stability and a composition, in wt. % based on oxide content, of $SiO_2$, 2-8; $B_2O_3$, 15-22; $La_2O_3$, 35-42; ZnO, 10-18; $TiO_2$, 9-15; $ZrO_2$, 3-10; $Nb_2O_5$, 4-10; and $WO_3$, >0.5-3. Besides containing at most 5 wt. % of each of $GeO_2$, $Ag_2O$ and BaO and conventional fining agents, they may also contain at most in total 5 wt. % of $Al_2O_3$, MgO, CaO, SrO, $P_2O_5$ and up to at most in total 5 wt. % of the components F, $Ta_2O_5$. The glasses are preferably free of alkali metal oxides, $Bi_2O_3$, $Y_2O_3$, $Gd_2O_3$ and/or $Yb_2O_3$. Optical elements made from the optical glass are also described.

16 Claims, No Drawings

OPTICAL GLASS, OPTICAL ELEMENTS MADE THEREFROM, METHOD OF MAKING THE OPTICAL ELEMENTS FROM THE GLASS, AND OPTICAL COMPONENTS COMPRISING ONE OR MORE OPTICAL ELEMENTS

CROSS-REFERENCE

The invention described and claimed herein below is also described in German Patent Application 10 2009 010 701.0, filed Feb. 27, 2009 in Germany. The aforesaid German Patent Application, whose subject matter is incorporated herein by reference thereto, provides the basis for a claim of priority of invention for the invention claimed herein below under 35 U.S.C. 119 (a)-(d).

BACKGROUND OF THE INVENTION

The Field of the Invention

The present invention relates to an optical glass, the use of such a glass, to optical elements or preforms of such optical elements, to a method for producing such optical elements and to optical parts or optical components comprising such optical elements.

Conventional optical glasses with the optical position claimed here (lanthanum hard flint range with a low Abbé number) for the application fields of imaging, sensors, microscopy, medical technology, digital projection, photolithography, laser technology, wafer/chip technology, and for telecommunication, optical communications engineering and optics/lighting in the automotive sector, generally contain PbO in order to achieve the desired optical properties, i.e. a refractive index $n_d$ of $1.83 \leq n_d \leq 1.95$ and/or an Abbé number $v_d$ of $24 \leq v_d \leq 35$, but in particular high dispersion i.e. a low Abbé number. This makes these glasses less chemically stable. $As_2O_3$ is furthermore often used as a fining agent. Since the glass components PbO and $As_2O_3$ have been regarded as environmentally unfriendly in recent years, most manufacturers of optical instruments and products tend to use lead- and arsenic-free glasses in preference. For use in high price range products, glasses with increased chemical stability are also constantly gaining importance.

Known lead-free glasses of the lanthanum hard flint position with a high refractive index and low Abbé number generally contain large amounts of $TiO_2$ in a silicate matrix, which leads to glasses which are extremely susceptible to crystallization and therefore often not processable in a secondary hot forming step, and are very difficult to process mechanically owing to high hardness. Furthermore, such glasses have degraded transmission at the "blue edge".

Instead of the hitherto customary machining of optical components from block or ingot glass, production methods in which direct pressings, i.e. blank-pressed optical components and/or preforms for re-pressing which are as close as possible to the final contour, so-called "precision gobs", can be obtained directly at the end of melting the glass have recently been gaining importance. "Precision gobs" are generally intended to mean preferably fully fire-polished, semifree- or free-formed glass portions, which can be obtained via various production methods.

For this reason the need for "short" glasses, i.e. for glasses whose viscosity changes very greatly with temperature, has recently been reported increasingly in the context of melting and hot forming process technology. This behavior has the advantage in processing that it is possible to reduce the hot forming times, and therefore the mold closure times in precision hot forming close to final geometry. In this way on the one hand the throughput can be increased, and on the other hand the mold material is thereby conserved, which has a very positive effect on the overall production costs. Furthermore, owing to the faster solidification thereby obtained, it is also possible to process glasses with a greater susceptibility to crystallization than in the case of correspondingly longer glasses, and pre nucleation, which could be problematic in later secondary hot forming steps, is avoided or at least drastically reduced.

Glasses at this optical position have recently been produced often by using $Bi_2O_3$. These glasses, however, exhibit the significant process engineering disadvantage that they are very sensitive to the redox conditions in the melting apparatus and, under unfavorable redox conditions, there is a risk of transmission reduction due to the formation of BiO, and they therefore require increased process engineering awareness.

The prior art relevant to the invention is summarized in the following documents:
DE 3 343 418 C2 Schott Glaswerke (now SCHOTT AG)
DE 2 265 703 Hoya Corp.
DE 2 756 161 A Ohara Optical Glas
DE 2 652 747 B Nippon Kogaku
JP 2003-238 198 A Minolta Camera
US 2004/0220041 Hikari Glass Ltd.
EP 1 433 757 Hoya Corp.
JP 2005-047 732 Minolta Camera
JP 2004-175 632 Hikari Glass Ltd.
US 2006/0189473 Hoya Corp.
DE 10 2006 039 287 Hoya Corp.

Accordingly glasses can be produced with a similar optical position and/or comparable chemical composition, but these glasses exhibit considerable disadvantages in comparison with the glasses according to the invention:

DE 3 343 418 C2 describes lanthanum borate glasses with a boron oxide content of only at most 13 wt. %. The glasses furthermore always contain yttrium oxide (up to 10 wt. %). This is used, in addition to the likewise mandatory total content of tantalum and ytterbium oxide $(Ta_2O_5+Yb_2O_3)>9$ wt. %, to adjust the desired optical position. The disadvantage of using the components $Y_2O_3$ and $Yb_2O_3$, however, resides in their absorption, described in the document by pure transmission of from 70 to 81% remaining constant over the range of from 500 to 2400 nm (25 mm sample thickness). Such a poor transmission is no longer acceptable for contemporary glasses, and the total costs are also increased significantly by these components.

DE 2 265 703 describes glasses with a boron content of at least 24 wt. %. Furthermore, the problem of insufficient transmission likewise arises—here correspondingly due to $Gd_2O_3$ (up to 50 wt. %). The glasses described in this prior art only achieve the high refractive indices of the glasses according to the invention at the edge.

DE 2 756 161 A likewise describes glasses mandatorily containing $Gd_2O_3$, and DE 2 652 747 B glasses containing $Y_2O_3$, with corresponding disadvantages regarding pure transmission and total costs. The glasses described in these documents furthermore have too low a $TiO_2$ content and do not satisfy the proportions regarding ZnO content (DE 2 756 161 A) or $GeO_2$ content (DE 2 652 747 B).

JP 2003 238 198 A describes lanthanum borate glasses containing fluoride with a more moderate optical position $(n_d<1.8; v_d>35)$, which have a fluorine content of 9 to 15 wt. %. The more extreme optical position of the glasses according to the invention cannot be achieved by means of a lanthanum borate glass composition containing fluoride. Furthermore, the use of raw materials containing fluoride entails significant process engineering disadvantages: the high volatility, both of the raw materials containing fluoride and of the component itself, besides atomization and evaporation problems which make reproduction and stability of the melt profile/tank transit more difficult, also cause increased outlay and costs in relation to occupational safety in charge preparation and the melting process. For these reasons, the use of fluoride is substantially avoided in the glasses according to the invention, except for minor contents (at most 5 wt. %) for fine adjustment of the refractive index position.

US 2004/0220041 claims glasses with a barium oxide content of from 13 to 30 wt. %. For this reason, although these glasses offer very great flexibility in the adjustment of a process-adapted viscosity-temperature profile, they do not however exhibit good crystallization stability. Glasses described in JP 2004-175 632 (BaO greater than or equal to 13 wt. %) and in US 2006/0189473 (BaO greater than or equal to 6 wt. %) also have this disadvantage.

The glasses claimed in EP 1 433 757 have a tungsten oxide content of less than 0.5 wt. %. This document furthermore discloses that $WO_3$ has a significantly detrimental effect on the pure transmission at the UV edge of the spectrum ("blue edge").

The glasses described in JP 2005-047 732 have too high a ZnO content of 18 to 23 wt. %, and too low a $TiO_2$ content of only from 1 to 6 wt %.

The glasses mentioned in DE 10 2006 039 287 describe a composition range in which the glasses must contain at least 7 wt. %, although usually much more than 10 wt. % and up to 23 wt. % $Gd_2O_3$. Glasses with a minimum $WO_3$ content of greater than or equal to 7 wt. % are likewise described therein. These raw materials, which are very expensive and in the case of $WO_3$ also highly detrimental in respect to transmission, can be obviated in the glasses according to the invention since the desired optical positions are significantly different: Hoya claims positions with much lower dispersions (Abbé value 35-40), whereas the glasses according to the invention claim high refractive indices with high dispersions (Abbé values from below 24) for chromatic aberration correction in objective systems. Another distinguishing feature is the different boron oxide content, which in the examples of the Hoya document only exceptionally reaches 15 or 16 wt. % once, but is much lower in the majority of glasses described.

DE 10 2006 024 805 describes glasses with a ZnO content of only from 0.1 to 6 wt. % and a BaO proportion of from 13 to 22 wt. %. DE 102 27 494 likewise describes glasses with a ZnO content of only at most 9 wt. %. These documents furthermore mention a fairly large $La_2O_3:B_2O_3$ ratio.

SUMMARY OF THE INVENTION

It is therefore an object of the present invention to provide optical glasses which avoid the said disadvantages of the aforementioned prior art and which permit the desired optical properties. In particular, a composition range for short optical glasses is to be found, which as far as possible permits the desired optical properties ($n_d/v_d$) without using PbO, $Bi_2O_3$ and $As_2O_3$ and with a reduced $TiO_2$ content. The glasses should have a high transmission, good chemical stability and processability, low production costs and good environmental compatibility. These glasses should preferably be processable by means of the blank pressing method and therefore have low transition temperatures. Furthermore they should be readily meltable and processable, and have sufficient crystallization stability for a secondary hot forming step and/or manufacture in continuously operated apparatus. A glass which as far as possible is short in a viscosity range of from $10^{7.6}$ to $10^{13}$ dPas is furthermore desirable.

The aforementioned object is achieved by the embodiments described in the claims appended herein below.

In particular, an optical glass is provided which comprises the following composition (in wt. %, based on oxide):

| | |
|---|---|
| $SiO_2$ | 2-8 |
| $B_2O_3$ | 15-22 |
| $La_2O_3$ | 35-42 |
| ZnO | 10-18 |
| $TiO_2$ | 9-15 |
| $ZrO_2$ | 3-10 |
| $Nb_2O_5$ | 4-10 |
| $WO_3$ | 0.5-5. |

The glasses according to the invention preferably have a refractive index $n_d$ of at least 1.83; a refractive index of at least 1.85 and/or a refractive index $n_d$ of at most 1.95 is more preferable. The Abbé number $v_d$ of the glasses according to the invention is preferably at least 24, more preferably at least 36 and/or at most 35.

According to one embodiment, the glasses according to the invention are as far as possible "short" in a viscosity range of from $10^{7.6}$ to $10^{13}$ dPas. "Short glasses" are intended to mean glasses whose viscosity varies greatly with a relatively small temperature change in a particular viscosity range. The temperature interval $\Delta T$, in which the viscosity of this glass decreases from $10^{7.6}$ to $10^{13}$ dPas, is preferably at most 100 K.

In what follows, the expression "X-free", "free of a component X" or "contains no X" mean that the glass essentially does not contain this component X, i.e. such a component is present at most as an impurity in the glass but is not added as a separate component to the glass composition. X stands for any component, for example $Li_2O$.

The basic glass system is a lanthanum borate glass, the borate being responsible for the solubility of lanthanum oxide. In the prior art, it has been assumed for these glasses that below a $La_2O_3:B_2O_3$ ratio of less than 5.0 in this glass system fairly stable glasses can be formed, that below an $La_2O_3:B_2O_3$ ratio of about 3.6 there is a stable region, and an $La_2O_3:B_2O_3$ ratio of from 2.4 to 3.4 is therefore generally desirable. In principle an even lower $La_2O_3:B_2O_3$ ratio would be desirable in order to obtain a crystallization-stable glass, although relatively large borate proportions would be required for this, so that it has been assumed in the prior art that it is not simultaneously possible to introduce into the glass enough highly refractive components to achieve a high refractive index and enough network modifiers to achieve a short glass.

Surprisingly, according to the present invention it has been found that stable and sufficiently short glasses can be produced with the desired position even with an $La_2O_3:B_2O_3$ ratio of preferably at most 2.5, more preferably at most 2.4.

The glass according to the invention contains $B_2O_3$ in an amount of 15 to 22 wt. %. The $B_2O_3$ proportion is preferably limited to at most 20 wt. %, more preferably at most 19 wt. %. The glass according to the invention preferably contains at least 16 wt. % $B_2O_3$.

The glass according to the invention contains $La_2O_3$ in an amount of 35 to 42 wt. %. The glass preferably contains at least 35 M. % $La_2O_3$, more preferably at least 36 wt. %. The proportion of $B_2O_3$ is preferably limited to 20 wt. %, more preferably 19 wt. %.

As a further glass-forming substance besides $B_2O_3$, the glass according to the invention contains $SiO_2$ in a proportion of from 2 to 8 wt. %. $SiO_2$ serves to improve the processability by increasing the mechanical strength of the glass, which preferably contains it in a proportion of 3 wt. %, more preferably in a proportion of 4 wt. %. It is thus possible to achieve good abrasion hardness and a good chemical stability, preferably an acid resistance of less than class 5, more preferably less than class 4 according to ISO 8424 and/or preferably an alkali resistance of less than 2, more preferably less than or equal to 1 according to ISO 10629. The $SiO_2$ amount is preferably limited to 7 wt. %, more preferably 6 wt. %. With higher $SiO_2$ amounts, the solubility of lanthanum oxide in the glass matrix is greatly reduced so that with a consistently high $La_2O_3$ proportion the glasses would be more susceptible to crystallization, or with a reduced $La_2O_3$ proportion they would no longer have a sufficiently high refractive index and the optical position would be shifted overall.

Preferably, the sum of $SiO_2$ and $B_2O_3$ is at most 29 wt. %, preferably at most 27 wt. %.

Preferably, the glass according to the invention has a $SiO_2$:$B_2O_3$ ratio of from 0.12 to 0.38, more preferably from 0.25 to 0.35. With a lower $SiO_2$:$B_2O_3$ ratio, the aforementioned positive effect of $SiO_2$, i.e. to inhibit crystallization and to form glass, would not be an effective, and with a larger ratio the solubility of $La_2O_3$ is reduced owing to an insufficient borate content and the glass becomes more sensitive to crystallization.

According to a preferred embodiment of the present invention, the glass according to the invention has both a total content $SiO_2+B_2O_3$ and an $SiO_2$:$B_2O_3$ ratio as mentioned above.

The ratio of the sum $(La_2O_3+SiO_2)$ to the $B_2O_3$ content represents a measure of the crystallization risk, and is preferably from 2.0 to 2.9, more preferably from 2.3 to 2.7.

As a further glass-forming substance, the glass according to the invention may contain $GeO_2$ in a proportion of preferably at most 5 wt. %, more preferably at most 2 wt. %. Adding this further glass-forming substance can make the glass according to the invention more crystallization-stable without a solubility-reducing effect regarding lanthanum oxide, as would occur in the case of $SiO_2$. At the same time, $GeO_2$ also affects the optical position by further increasing the refractive index of the glass, and in the proportion mentioned above it exerts only a small influence on the dispersion. An amount of more than 5 wt. % would increase the dispersion of the optical glass, i.e. the Abbé number to a value of more than 35.

The total sum of glass-forming substances $B_2O_3$, $SiO_2$ and $GeO_2$ is preferably at most 32 wt. %, more preferably 30 wt. %, and most preferably 27 wt. %.

Besides $La_2O_3$, the glass according to the invention contains as its most important optical component, i.e. a component which exerts a substantial influence on the optical position of the glass, $TiO_2$ in an amount of 9 to 15 wt. %, by means of which a high refractive index is achieved with a low Abbé number. The $TiO_2$ proportion is preferably at least 10 wt. %. With a $TiO_2$ proportion of less than 9 wt. %, neither the desired optical position nor the desired shortness of the glass can be adjusted. The glass according to the invention preferably contains $TiO_2$ in a proportion of at most 14 wt. %, more preferably at most 13 wt. %. A further increase in the $TiO_2$ proportion would raise the crystallization limit of the glass to such an extent that a process window for (further) processing of the glass would no longer be possible. Since $TiO_2$ in combination with alkaline earth metal oxides furthermore makes the glass shorter, a higher proportion of $TiO_2$ would make the glass no longer processable owing to extreme shortness.

Besides $TiO_2$, the glass according to the invention also contains $Nb_2O_5$ for adjusting the optical position in a proportion of at least 4 wt. %, more preferably at least 5 wt. % and/or in a proportion of at most 10 wt. %, more preferably at most 9 wt. %. The proportion of this component is however preferably restricted to the maximum limit mentioned above, since otherwise the raw material costs for the glass according to the invention would be increased too greatly.

As a further optical component which increases the refractive index of the glass, the glass according to the invention contains $ZrO_2$ in a proportion of at most 10 wt. %, preferably at most 8 wt. %. Higher $ZrO_2$ contents would increase the tendency of the glass to crystallize. The glass contains $ZrO_2$ in a proportion of at least 3 wt. %, preferably at least 4 wt. %.

The glass preferably contains at least two, more preferably at least three components which can also act as crystallization nucleation agents in addition to their positive effects on the glass, in particular $ZrO_2$, $Nb_2O_5$ and/or $TiO_2$, since a larger number of such components reduces the crystallization risk.

For adjusting the optical position, the glass according to the invention furthermore contains $WO_3$ in a proportion of at least 0.5 wt. %, preferably at least more than 1 wt. %, more preferably at least 12 wt. %. The proportion of $WO_3$ is however limited to at most 5 wt. %, preferably at most 3 wt. %, since with higher proportions the transmission would be degraded particularly at the "blue edge", i.e. at a wavelength λ of less than 420 nm. Contrary to the assumptions in the prior art, however, such degradation of the transmission due to $WO_3$ surprisingly does not begin until a $WO_3$ content of more than 3 wt. %. $WO_3$ proportions of up to 3 wt. % surprisingly improve the transmission.

The glass according to the invention may also contain $Ta_2O_5$ and/or F as further optical components for fine adjustment of the optical position, although the sum of these components is limited to 5 wt. %.

Besides glass-forming substances and optical components, the glass according to the invention furthermore contains network modifiers which, above all, influence the viscosity-temperature profile of the glass.

Besides $TiO_2$, alkaline earth metal oxides may in particular be used as such network modifiers.

However, the glass according to the invention differs from the glasses of the prior art since the BaO content is limited to a comparatively low proportion of at most 5 wt. %, preferably at most 4 wt. %, more preferably at most 2 wt. %. In fact, a high proportion of BaO is commonly used in highly refractive glasses in order to simultaneously increase the refractive index of the glass in addition to the network-modifying function.

The sum of the alkaline earth metals MgO, CaO, BaO, SrO is preferably limited to a proportion of at most 7 wt. %, more preferably to a proportion of 5 wt. %.

Surprisingly, it has been found that a high BaO proportion can be replaced according to the invention by a relatively high ZnO proportion of at least 10 wt. %, more preferably at least 12 wt. %. The ZnO proportion is limited to at most 18 wt. %, preferably at most 16 wt. %. ZnO in the said proportion in the glass according to the invention leads both to a high refractive index and to sufficient shortness of the glass. Furthermore, this component also acts to inhibit crystallization and it is suspected that the low $La_2O_3$:$B_2O_3$ ratio according to the invention is made possible owing to the presence of ZnO in the said proportions.

Besides the network modifiers mentioned above, the glass according to the invention may furthermore contain the components $Al_2O_3$ and/or $P_2O_5$ which act as glass-forming substances, in which case the sum of $Al_2O_3$, MgO, CaO, SrO and $P_2O_5$ is preferably limited to at most 5 wt. %.

The glass according to the invention preferably does not contain alkali metal oxides, i.e. oxides of Li, Na, K, Rb, Cs, since in addition to a refractive index-lowering effect these components also act as fluxes and can thus make the glass more susceptible to crystallization.

According to other embodiments, however, the glass according to the invention may contain alkali metal oxides in a proportion of in total at most 5 wt. %. Such low proportions of alkali metal oxides can be used for minor adjustments of the temperature-viscosity profile in order to adapt the glass in favor of flexible hot forming close to final geometry.

The addition of alkali metal oxides is furthermore preferred when the glass is intended to be used for ion exchange. In such a variant, the glass may actually contain more than 3, and under certain circumstances even up to wt. % of alkali metal oxides.

For use of the glass as an ion exchange glass, it is furthermore preferable to add up to 5 wt. % $Ag_2O$. For this application, the glass preferably also contains $Al_2O_3$ and/or $P_2O_5$, for example in a proportion of at least 0.5 wt. %, since these components promote the formation of a structure favorable for ion exchange in the glass. According to such an embodiment, however, the upper limits mentioned above should also not be exceeded.

The glass according to the invention is preferably free of $Y_2O_3$, $Yb_2O_5$ and/or $Bi_2O_3$, since these components can degrade the transmission of the glass particularly at the "blue edge" ($\lambda$<420 nm). It is particularly preferable for the glass to contain none of the said components. $Y_2O_3$ and $Yb_2O_5$ furthermore have the disadvantage of high raw material costs. Furthermore, $Bi_2O_3$ can be reduced in the glass melt to Bi(0) and thus degrade the transmission of the glass. Avoiding such redox processes in the melt, however, requires great outlay on melting technology.

As an optical glass, the glass according to the invention is preferably free of colouring and/or optically active e.g. laser-active components.

Also, the optical glass is preferably free of $Gd_2O_3$.

According to another embodiment of the present invention, as a base glass of an optical filter or solid-state laser, the glass according to the invention may contain colouring and/or optically active e.g. laser-active components in contents of up to at most 5 wt. % in which case these amounts are provided in addition to the other components of the glass composition which add up to 100 wt. %.

According to one embodiment of the present invention, at least 90 wt. %, more preferably at least 95 wt. % of the glass according to the invention consists of the components mentioned above.

According to another embodiment of the present invention, the glass according to the invention is also free of other components not mentioned above, i.e. according to such an embodiment of the glass consists essentially of the components mentioned above. The expression "consist essentially of" means that other components are present at most as impurities but are not intentionally added as a separate component to the glass composition.

The glass according to the invention may contain conventional fining agents in small amounts. The sum of the fining agents added is preferably at most 2.0 wt. %, more preferably at most 1.0 wt. %, in which case these amounts are provided in addition to the other components of the glass composition which add up to 100 wt. %. The glass according to the invention may contain at least one of the following components as a fining agent (in wt. %, in addition to the rest of the glass composition):

| | | |
|---|---|---|
| $Sb_2O_3$ | 0-1 | and/or |
| SnO | 0-1 | and/or |
| $SO_4^{2-}$ | 0-1 | and/or |
| NaCl | 0-1 | and/or |
| $As_2O_3$ | 0-1 | and/or |
| $F^-$ | 0-1. | |

According to a preferred embodiment of the present invention, however, the $As_2O_3$ content is at most 0.1 wt. % or the glass is $As_2O_3$-free, since this component is regarded as problematic for ecological reasons.

All the glasses according to the invention furthermore have good chemical resistance and stability against crystallization, or crystallization stability. They are furthermore distinguished by good meltability and flexible processability close to final geometry, low production costs due to reduced process costs, good ion exchange properties, good solarization stability, and by good environmental compatibility.

The glasses according to the invention have a Tg of less than or equal to 640° C., are crystallization-stable and can be processed well.

The glasses according to the invention have a negative anomalous relative partial dispersion $\Delta P_{g,F}$ of from 15 to $105 \times 10^4$ on measurement samples from cooling with a cooling rate of about 20 K/h.

The glasses according to the invention have thermal expansion coefficients $\alpha_{20\text{-}300}$ of at most $8*10^{-6}$/K. Problems with thermal stress in further processing and assembly technology are therefore avoided.

The glasses according to the invention have specific densities of less than or equal to 5.0 g/cm$^3$. Owing to their low carrying mass as considered relative to pendants containing lead, the optical elements and/or optical components made from them are therefore particularly suitable for mobile/portable units.

By virtue of the glasses according to the invention, an adjustment of optical position, viscosity-temperature profile and processing temperatures has been achieved such that highly specified hot forming close to final geometry is ensured even with sensitive precision machines. A correlation of crystallization stability and viscosity-temperature profile has furthermore been achieved so that further thermal processing of the glasses is readily possible, for instance pressing or re-pressing, or ion exchange processes.

The present invention furthermore relates to the use of the glasses according to the invention for the application fields of imaging, sensors, microscopy, medical technology, digital projection, telecommunication, optical communications engineering/information transmission, optics/lighting in the automotive sector, photolithography, steppers, excimer lasers, wafers, computer chips and/or integrated circuits and electronic devices which contain such circuits and chips.

The present invention furthermore relates to optical elements which comprise the glass according to the invention. The optical elements may in particular be lenses, prisms, light guide rods, arrays, optical fibres, gradient components, optical windows and compact components. The term "optical element" according to the invention also covers semi-finished parts or preforms of such an optical element, for example gobs, precision gobs and the like.

The invention furthermore relates to a method for producing an optical element, comprising the following step:

blank pressing the optical glass according to the invention.

The invention furthermore relates to the use of such an optical element to produce optical parts or optical components, for example for sensors, microscopy, medical technology, digital projection, telecommunication, optical communications engineering/information transmission, optics/lighting in the automotive sector, photolithography, steppers, excimer lasers, wafers, computer chips and integrated circuits and electronic devices which contain such circuits and chips.

The invention furthermore relates to optical parts or optical components, for example for imaging, sensors, microscopy, medical technology, digital projection, telecommunication, optical communications engineering/information transmission, optics/lighting in the automotive sector, photolithography, steppers, excimer lasers, wafers, computer chips and/or integrated circuits and electronic devices which contain such circuits and chips comprising optical elements as mentioned above.

EXAMPLES

Tables II and III contain seven exemplary embodiments in the preferred composition range, and two comparative examples. The glasses described in the examples were produced as follows:

The raw materials for the oxides, preferably the corresponding oxides, nitrides or carbonates, are weighed out, one or more fining agents are optionally added, for example $Sb_2O_3$, and these are subsequently mixed well. The glass charge is melted at about 1250° C. in a batch melting apparatus, then fined (1300° C.) and homogenized. With a casting temperature of about 1000° C., the glass can be cast and processed to the desired dimensions. In large-volume continuous apparatus, according to experience the temperatures can be reduced by at least about 100 K and the material can be processed by methods of hot forming close to final geometry, for example precision pressing.

TABLE I

MELT EXAMPLE FOR GLASS (calculated to 100 kg)

| Oxide | wt. % | Raw material | Weigh-in (kg) |
|---|---|---|---|
| $SiO_2$ | 3.0 | $SiO_2$ | 3.01 |
| $B_2O_3$ | 19.0 | $H_3BO_3$ | 33.80 |
| $La_2O_3$ | 40.0 | $La_2O_3$ | 40.05 |
| BaO | 3.2 | $Ba(NO_3)_2$ | 5.44 |
| ZnO | 17.0 | ZnO | 17.05 |
| $TiO_2$ | 9.0 | $TiO_2$ | 9.07 |
| $ZrO_2$ | 3.0 | $ZrO_2$ | 3.01 |
| $Nb_2O_5$ | 5.0 | $Nb_2O_5$ | 5.02 |
| $WO_3$ | 0.8 | $WO_3$ | 0.80 |
| $Sb_2O_3$ | 0.3 | $Sb_2O_3$ | 0.30 |
| Sum | 100.3 | | 117.55 |

TABLE II

MELT EXAMPLES (in wt. %)

| | Ex. 1 | Ex. 2 | Ex. 3 | Ex. 4 | Ex. 5 | Ex. 6 |
|---|---|---|---|---|---|---|
| $SiO_2$ | 2 | 5 | 6 | 2 | 5 | 3 |
| $B_2O_3$ | 17 | 16 | 18 | 15 | 17 | 19 |
| $La_2O_3$ | 41 | 39 | 34 | 42 | 35 | 40 |
| $GeO_2$ | — | — | — | — | — | — |
| CaO | — | — | — | — | — | — |
| BaO | 2 | 2 | — | — | — | 3.2 |
| ZnO | 10 | 14 | 16 | 18 | 15 | 17 |
| $TiO_2$ | 15 | 9 | 13 | 14 | 13 | 9 |
| $ZrO_2$ | 6 | 4 | 8 | 3 | 3 | 3 |
| $Nb_2O_5$ | 4 | 10 | 4 | 5 | 8 | 5 |
| $WO_3$ | 3 | 1 | 1 | 1 | 4 | 0.8 |
| $Sb_2O_3$ | 0.3 | — | — | 0.3 | — | 0.3 |
| Sum | 100.3 | 100.0 | 100.0 | 100.3 | 100.0 | 100.3 |
| $n_{d\,(20K/h)}$ | 1.94675 | 1.90427 | 1.89438 | 1.94916 | 1.91473 | 1.87634 |
| $v_{d\,(20K/h)}$ | 28.78 | 31.49 | 30.64 | 29.21 | 29.00 | 33.69 |
| $P_{g,F\,(20K/h)}$ | 0.6035 | 0.5940 | 0.5981 | 0.6012 | 0.6035 | 0.5888 |
| $\Delta P_{g,F}\,[10^{-4}]_{(20K/h)}$ | 81 | 32 | 58 | 65 | 85 | 17 |
| $\alpha_{20-300}\,[10^{-6} * K^{-1}]$ | 7.7 | 7.4 | 6.8 | 8.0 | 7.0 | 7.7 |
| Tg [° C.] | 623 | 612 | 614 | 600 | 610 | 597 |
| ρ [g/cm$^3$] | 4.65 | 4.60 | 4.37 | 4.76 | 4.47 | 4.57 |

TABLE III

MELT EXAMPLES (in wt. %) (continued)

| | Ex. 7 | Ex. 8 | Ex. 9 | Ex. 10 | Ex. 11 |
|---|---|---|---|---|---|
| $SiO_2$ | 5 | 7 | 4 | 4 | 8 |
| $B_2O_3$ | 17 | 22 | 18 | 16 | 21 |
| $La_2O_3$ | 38 | 37 | 36 | 35 | 36 |
| $GeO_2$ | — | — | — | — | 2 |
| CaO | — | — | 2 | 1 | — |
| BaO | — | 2.4 | — | 4 | 2.4 |
| ZnO | 14 | 14 | 13 | 13 | 12 |
| $TiO_2$ | 12 | 10 | 9 | 12 | 10 |
| $ZrO_2$ | 6 | 3 | 10 | 4 | 4 |
| $Nb_2O_5$ | 7 | 4 | 6 | 9 | 4 |

TABLE III-continued

MELT EXAMPLES (in wt. %) (continued)

|  | Ex. 7 | Ex. 8 | Ex. 9 | Ex. 10 | Ex. 11 |
|---|---|---|---|---|---|
| $WO_3$ | 1 | 0.6 | 2 | 2 | 0.6 |
| $Sb_2O_3$ | 0.3 | — | 0.3 | — | 0.3 |
| Sum | 100.3 | 100.0 | 100.3 | 100.0 | 100.3 |
| $n_{d\,(20K/h)}$ | 1.90490 | 1.89331 | 1.89429 | 1.92038 | 1.83293 |
| $v_{d\,(20K/h)}$ | 30.93 | 24.01 | 32.57 | 29.65 | 34.43 |
| $P_{g,F\,(20K/h)}$ | 0.5967 | 0.6137 | 0.5908 | 0.6002 | 0.5884 |
| $\Delta P_{g,F}[10^{-4}]_{(20K/h)}$ | 49 | 103 | 18 | 63 | 25 |
| $\alpha_{20-300}[10^{-6}*K^{-1}]$ | 7.1 | 6.8 | 7.4 | 7.6 | 6.7 |
| $T_g$ [° C.] | 613 | 615 | 619 | 608 | 623 |
| $\rho$ [g/cm$^3$] | 4.50 | 4.22 | 4.50 | 4.56 | 4.20 |

While the invention has been illustrated and described as embodied in an optical glass, optical elements made therefrom, method of making the optical elements from the glass, and optical components comprising one or more of the optical elements, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An optical glass having a composition, in wt. % based on oxide content, of:

| $SiO_2$ | 2-8 |
|---|---|
| $B_2O_3$ | 15-22 |
| $La_2O_3$ | 35-42 |
| ZnO | 10-18 |
| $TiO_2$ | 9-15 |
| $ZrO_2$ | 3-10 |
| $Nb_2O_5$ | 4-10 |
| $WO_3$ | 0.5-5, | wherein the glass does not contain $Li_2O$ and does not contain $Gd_2O_3$.

2. The optical glass according to claim 1, further comprising one or more of the following ingredients in respective amounts within the stated amount ranges in wt. %:

| $GeO_2$ | 0-5 wt. % |
|---|---|
| BaO | 0-5 wt. % |
| ($Ta_2O_5$ + F) | 0-5 wt. %. |

3. The optical glass according to claim 1, but not containing any of PbO, $As_2O_3$, $Bi_2O_3$, $Y_2O_3$, and $Yb_2O_3$ as glass ingredients.

4. The optical glass according to claim 1, and having a refractive index $n_d$ of $1.83 \leq n_d \leq 1.94$ and/or an Abbé number $v_d$ of $24 \leq v_d \leq 35$.

5. An optical glass having a composition, in wt. % based on oxide content, of:

| $SiO_2$ | 2-8 |
|---|---|
| $B_2O_3$ | 15-22 |
| $La_2O_3$ | 35-42 |
| ZnO | 10-15 |
| $TiO_2$ | 9-15 |
| $ZrO_2$ | 3-10 |
| $Nb_2O_5$ | 4-10 |
| $WO_3$ | 0.5-5, | wherein a sum total amount of MgO+CaO+BaO+SrO is at most 5 wt. % and the glass does not contain $Gd_2O_3$.

6. The optical glass according to claim 5, further comprising one or more of the following ingredients in respective amounts within the stated amount ranges in wt. %:

| $GeO_2$ | 0-5 wt. % |
|---|---|
| BaO | 0-5 wt. % |
| ($Ta_2O_5$ + F) | 0-5 wt. %. |

7. The optical glass according to claim 5, but not containing any of PbO, $As_2O_3$, $Bi_2O_3$, $Y_2O_3$, and $Yb_2O_3$ as glass ingredients.

8. The optical glass according to claim 1, and having a refractive index $n_d$ of $1.83 \leq n_d \leq 1.94$ and/or an Abbé number $v_d$ of $24 \leq v_d \leq 35$.

9. An optical glass having a composition, in wt. % based on oxide content, of:

| $SiO_2$ | 2-8 |
|---|---|
| $B_2O_3$ | 15-22 |
| $La_2O_3$ | 35-42 |
| ZnO | 10-18 |
| $TiO_2$ | 9-15 |
| $ZrO_2$ | 3-10 |
| $Nb_2O_5$ | 4-10 |
| $WO_3$ | 0.5-5, | wherein the glass does not contain $Gd_2O_3$ and has a refractive index $n_d$ of $1.87634 \leq n_d \leq 1.94$ and an Abbé number $v_d$ of $24 \leq v_d \leq 33.69$.

10. A pressed gob formed from an optical glass according to one of claims 1 to 9 and which can be pressed after reheating.

11. An optical component comprising an optical glass according to one of claims 1 to 9.

12. A method of producing an optical component, said method comprising the step of blank pressing an optical glass according to one of claims 1 to 9.

13. An optical element comprising an optical glass, wherein the optical glass has a composition, in wt. % based on oxide content, of:

| | |
|---|---|
| $SiO_2$ | 2-8 |
| $B_2O_3$ | 15-22 |
| $La_2O_3$ | 35-42 |
| ZnO | 10-18 |
| $TiO_2$ | 9-15 |
| $ZrO_2$ | 3-10 |
| $Nb_2O_5$ | 4-10 |
| $WO_3$ | 0.5-5, | wherein the glass does not contain $Gd_2O_3$ and has a refractive index $n_d$ of $1.87634 \leqq n_d \leqq 1.94$ and an Abbé number $v_d$ of $24 \leqq v_d \leqq 33.69$.

14. The optical element according to claim 13, which is a lens, a prism, a light guide rod, an array, an optical fiber, a gradient component, or an optical window.

15. An optical part or component for imaging, sensors, microscopy, medical technology, digital projection, telecommunication, optical communications engineering/information transmission, optics/lighting in the automotive sector, for solar technology, photolithography, steppers, excimer lasers, wafers, computer chips and/or integrated circuits and electronic devices which contain said circuits and said chips, wherein said optical part or component comprises one or more optical element according to claim 13.

16. A method of producing an optical part or component for imaging, sensors, microscopy, medical technology, digital projection, telecommunication, optical communications engineering/information transmission, optics/lighting in the automotive sector, solar technology, photolithography, steppers, excimer lasers, wafers, computer chips and/or integrated circuits and electronic devices which contain said circuits and said chips, said method comprising using at least one of said optical element according to claim 13.

* * * * *